United States Patent

[11] 3,534,789

| [72] | Inventor | Woodrow Morris<br>Route 2, Vanceboro, North Carolina 28586 |
|---|---|---|
| [21] | Appl. No. | 703,467 |
| [22] | Filed | Feb. 6, 1968 |
| [45] | Patented | Oct. 20, 1970 |

[54] EDGER SET WORKS
8 Claims, 5 Drawing Figs.

[52] U.S. Cl. ................................................ 143/37,
318/467
[51] Int. Cl. ...................................................... B27b 5/34
[50] Field of Search .......................................... 143/37,
37.2, 46.37, 114, 114.6, 37.1, 115, 115.6, 120,
120.1; 318/467, 20.810, 20,810.5, 20.315

[56] References Cited
UNITED STATES PATENTS
2,992,661 7/1961 Burelbach ..................... 143/37
3,062,997 11/1962 Loyd ............................. 318/467
3,086,568 4/1963 Hartzell ....................... 143/120X Primary Examiner—William S. Lawson
Assistant Examiner—James F. Coan
Attorney—Strauch, Nolan, Neale, Nies and Kurz ABSTRACT: A control system for positioning a pair of edger saws in spaced relation to predetermine the width of finished stock. The control system embodies a reversible feed screw motor and two groups of selector switches positioned adjacent each other and activated by a cam driven by the feed screw motor which also drives respective saw positioning guides. The number of switches in each group corresponds to the number of predetermined set positions desired. Additionally, overtravel limit switches are provided to limit the travel of the saws toward and away from each other within a prescribed distance range.

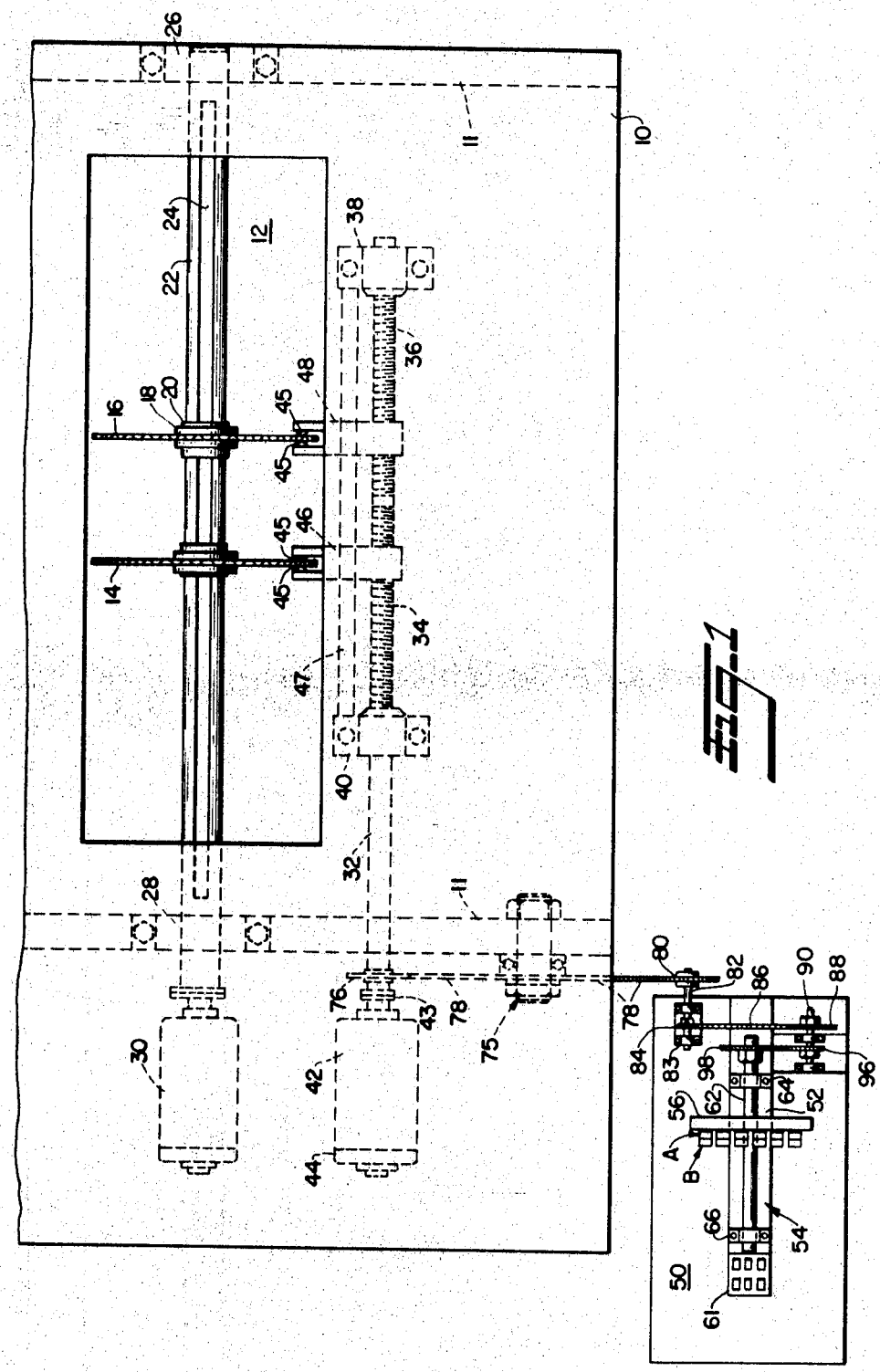

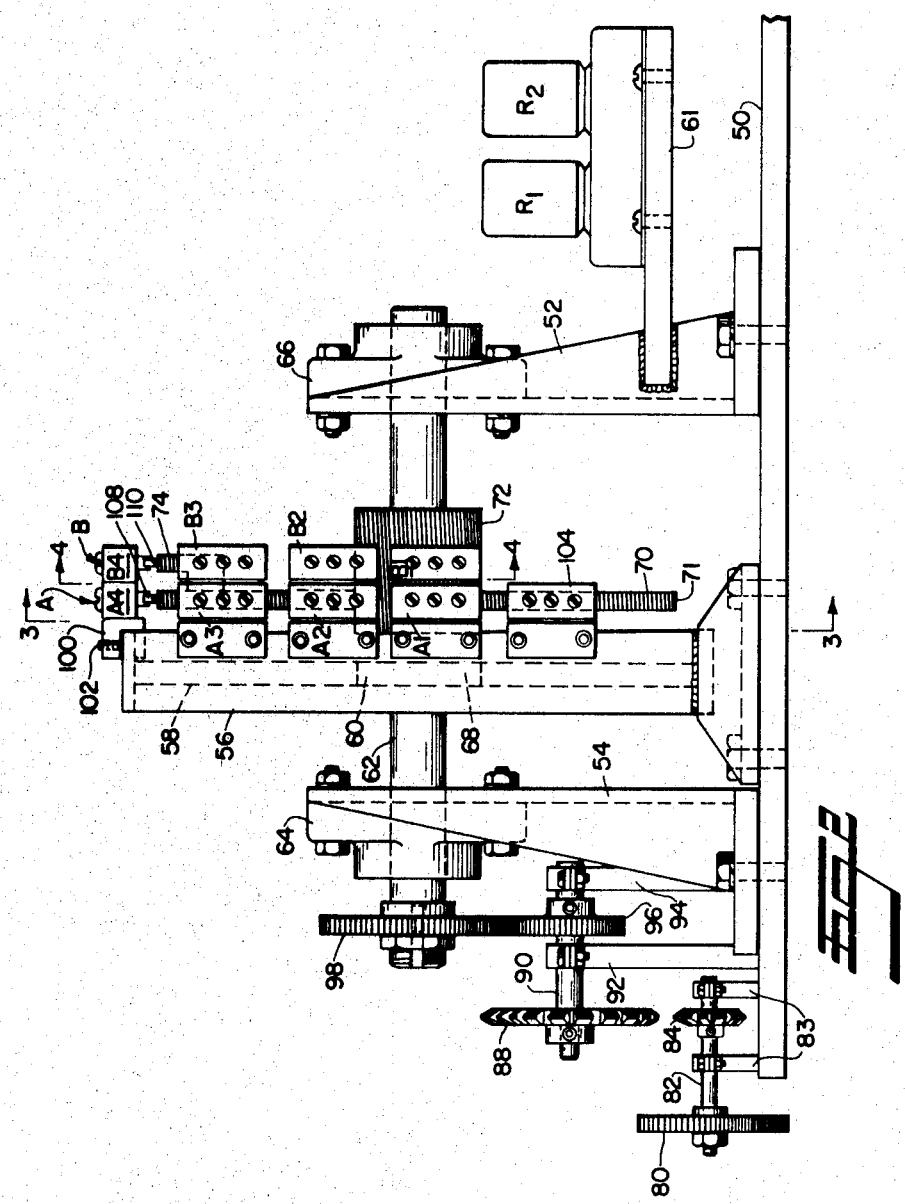

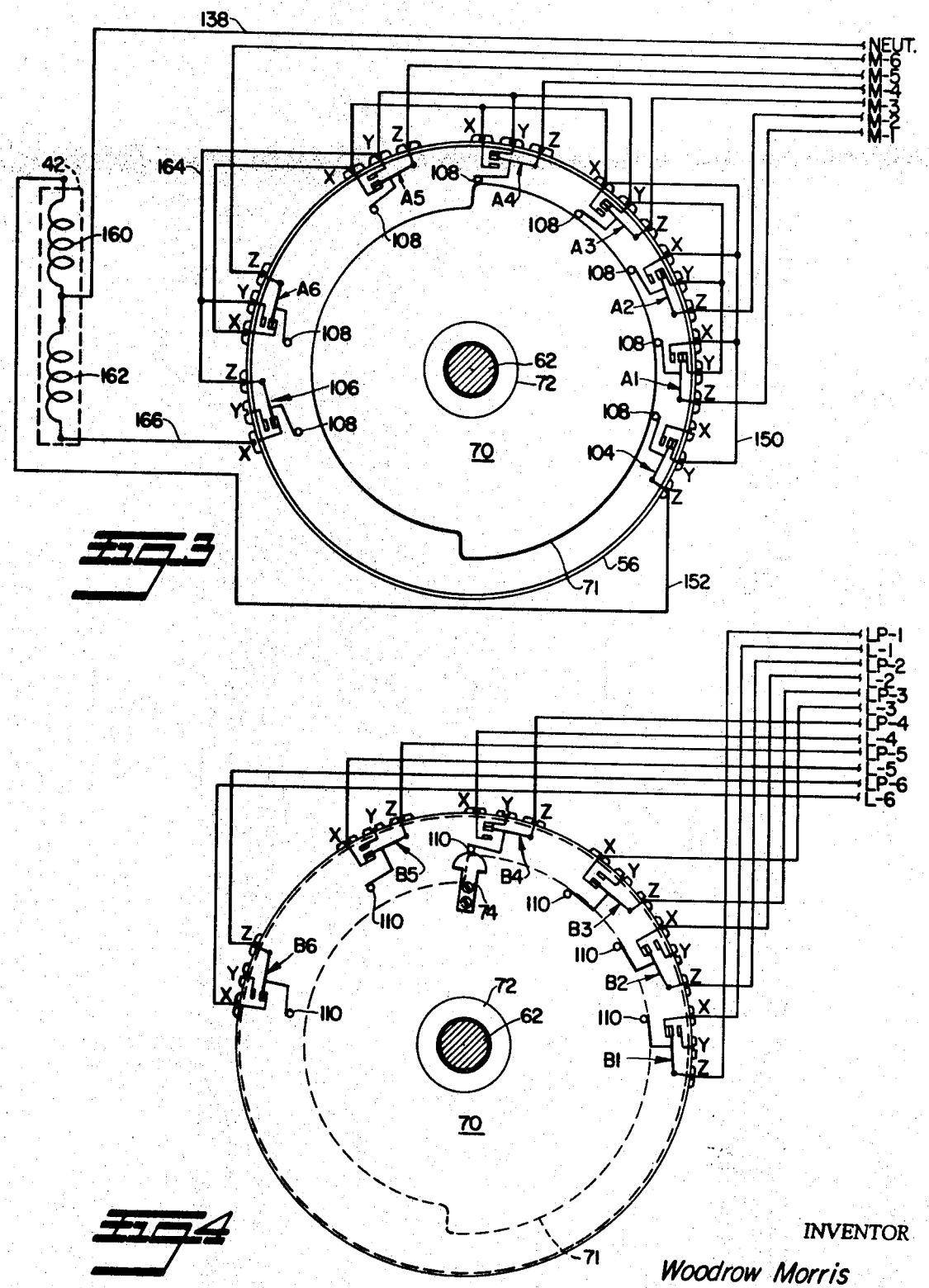

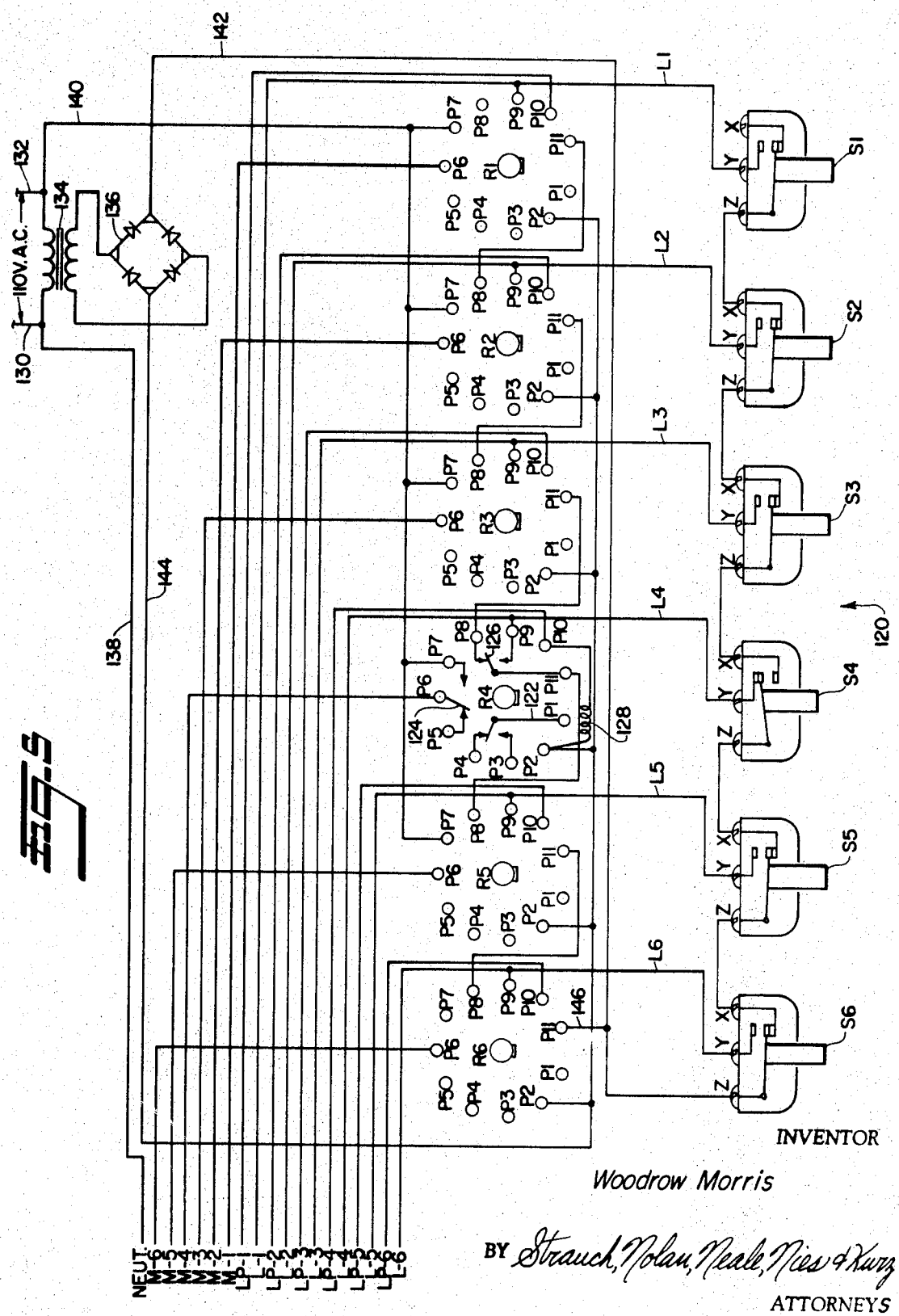

EDGER SET WORKS

BACKGROUND OF THE INVENTION

1. Field of the Invention

This invention relates generally to control apparatus for saws such as edger saws, line bar resaws, trimmers, cutoff saws, etc., for cutting and trimming wood pieces to exact predetermined widths and lengths, and more particularly to a relatively simple, low cost remote actuated control system for automatically adjusting the relative lateral spacing of edger or like gang saws and, thus, the width and length of the wood piece cut by the saws.

2. Description of the Prior Art

Control systems for automatically positioning edger saws are known. These prior art systems have generally consisted of complicated and expensive electrical switching arrangements. Typical of such systems are those described in U.S. Letters Pat. Nos. 2,803,273, 2,992,661, and 3,093,168. These known conventional systems emphasize the need for a simple, relatively inexpensive, but yet accurate and efficient positioning arrangement for edger saws in the art.

SUMMARY OF THE INVENTION

The primary object of this invention is to provide a novel automatic positioning system for edger saws used in timber mills.

Another object of this invention is to provide a simple, relatively inexpensive control system for positioning the edger saws.

Another object of this invention is to provide a dual switch arrangement actuated by a rotary cam for controlling directly a saw positioning motor.

This invention accomplishes the above objects and overcomes the disadvantages of the prior art by providing a reversible motor driven feed screw for moving edger saws toward and away from each other and controlling the operation of the motor by a novel circular dual switch arrangement actuated by a rotary cam which is driven by the motor. The dual switch arrangement includes a first group of direction changing switches connected directly to the motor and having a number of switches corresponding to the number of predetermined set positions of the saws. Additionally, the first group of switches has a pair of overtravel limit switches to maintain the transverse movement of the saws within a minimum and maximum distance range. A second group of holding relay switches is physically mounted adjacent the first group of switches comprising a plurality of switches equalling the number of saw positions, the second group controlling the flow of electricity through the first group to the motor. A saw position selector device determines the position to which the saws are to be moved and, thus, the switches through which current flows to the reversible motor. A rotary cam, driven by the motor, is mounted adjacent the direction changing and holding relay switches to actuate the respective switches to stop the motor when the saws have reached the selected position.

BRIEF DESCRIPTION OF THE DRAWINGS

FIG. 1 is a plan view of the drive and control arrangement for the saws of a typical timber mill edger saws schematically illustrated;

FIG. 2 is a rear elevational view of the dual switch arrangement of FIG. 1;

FIG. 3 is a schematic view illustrating the arrangement of the motor direction changing switches and overtravel switches relative to the actuator cam as viewed generally along line 3-3 of FIG. 2;

FIG. 4 is a similar schematic view illustrating the holding relay switches relative to the cam as viewed generally along line 4-4 of FIG. 2 with the cam and mounting ring shown in dot-dash lines to illustrate their relation relative to the relay switches; and FIG. 5 illustrates a portion of the control circuit including the holding relays and position selector devices.

DESCRIPTION OF THE PREFERRED EMBODIMENT

Referring now to FIG. 1, the edger saws of conventional structure includes a work support table 10 supported by side plates 11 and having a rectangular opening 12 through which edger saws 14 and 16 extend to cut a workpiece on table 10 to desired widths or lengths. Each saw has a hub 18 securely mounted on a sleeve 20 which is longitudinally slidably keyed to arbor shaft 22 through a key and keyway assembly 24. Arbor shaft 22 is mounted underneath table 10 in bearings 26 and 28 and is driven by motor 30 to rotate the saws 14 and 16.

Also mounted to the underside of table 10 is a saw shifting mechanism comprising a drive screw 32 having a left hand threaded portion 34 and a right hand threaded portion 36, the screw being supported in bearings 38 and 40 and driven through coupling 45 by a reversible motor 42 having forward and reverse windings 160, 162 respectively (FIG. 3) and a braking device 44. A saw guide 46 is connected to screw portion 34 and its clevis arms engage saw 14 along its opposite faces, preferably through freely rotating caged balls 45, to move and position the saw longitudinally along shaft 22. Similarly, saw guide 48 is connected to screw portion 36 and engages saw 16 for movement thereof. Saw guides 46 and 48 encompass guide bar 47 which prevents them from rotating with respect to shaft 32. Depending upon the direction of rotation of motor 42 and screw 32, the saws 14 and 16 are moved by guides 46 and 48 toward or away from each other along arbor shaft 22 to predetermined selected positions to cut a workpiece fed across table 10 to a desired width or length.

The edger set works and saw positioning mechanism will now be described with reference to FIGS. 1 and 2. The set works includes a mounting pad 50, upstanding pillar members 52, 54, and annular ring member 56 having spokes 58 terminating in a centered journal hub 60. A plate 61 is edge mounted on pillar 52 and supports relays R1, R2, R3, R4, R5, and R6. A cam shaft 62 is rotatably supported in pillar bearings 64, 66 and ring bearing 68 located in hub 60. Rotary cam 70 is fixed to shaft 62 adjacent ring member 56 through sleeve 72 nonrotatably fixed to shaft 62 in any suitable manner (not shown) and has a radial outwardly disposed peripheral cam surface 71 (FIG. 3) provided at its leading end with an L-shaped bar 74 extending laterally therefrom.

The shaft 62 and cam 70 are rotated back and forth by reversible motor 42 over an arc of approximately 180° through a gear drive system 75 (FIGS. 1 and 2) including a driving gear 76 fixed to screw 32, an intermediate gear 78 journaled to the adjacent support side plate 11 of table 10, and driven gear 80 fixed to sprocket shaft 82 rotatably mounted on pad 50 by pillar structure 83. Connected to shaft 82 is a sprocket wheel 84, which through chain 86 drives sprocket wheel 88 to rotate shaft 90 which is rotatably mounted within pillar bearing 92 and 94 mounted on pad 50. A gear 96 fixed to shaft 90 meshes with and drives gear 98 fixed to shaft 62 to rotate shaft 62 and cam 70.

As best seen in FIGS. 2 and 3, a first group "A" of 110 volt AC direction changing switches A1, A2, A3, A4, A5, and A6 for motor 42 are arranged around the periphery of ring 56 and adjustably secured thereto by U-shaped clamps 100 and set screws 102. All the switches of group A lie in the same vertical plane with respect to the inner edge of ring 56. Also lying in the same vertical plane as and located at each end of the group A switches are overtravel switches 104 and 106, the function of which will be later described.

Referring to FIGS. 2 and 4, a second Group "B" of 24 volt DC relay holding switches B1, B2, B3, B4, B5, and B6 for relays R1—R6 are connected laterally adjacent to and supported from switches A1, A2, A3, A4, A5, and A6, respectively. Each of the switches of Group "A" and overtravel switches 104 and 106 have a follower contact element 108 which is engaged by rotary cam surface 71 for actuating the switches from one state to another. Similarly, each of the switches of Group "B" has a follower contact element 110 which is engaged by bar 74 to actuate these switches from one state to another.

The number of switches present in each of Groups "A" and "B" corresponds to the number of predetermined set positions for saws 14 and 16 and, in the specific embodiment illustrated, six saw positions are contemplated. The number of set positions may be varied merely by increasing or decreasing the number of switches in each of the groups, and the spacing between the saws for any given set position and thus the width or length of the cut board, may also be varied merely by adjusting the location of the switches around the periphery of ring 56 by shifting the clamp 100 and set screw 102.

In addition, it is also possible to duplicate the cam and ring structure to increase the number of set positions obtainable.

As shown in FIGS. 3 and 4, the switches A1—A6, B1—B6, and overtravel switches 104, 106 all have normally closed contacts "x", normally open contacts "y", and a common ground terminal "z". The various contacts are connected to each other and to the relay contacts of relays R1—R6 of FIG. 5 in the manner illustrated to allow automatic selection of any set position for the saws. In FIG. 3, conductor 150 connects the normally closed contact "x" of all of switches A1—A6 to the normally open contact "y" of limit switch 104. Conductor 164 connects the normally open contact "y" of all the switches A1—A6 to the common terminal "z" of limit switch 106.

Referring now to FIG. 5, the automatic control circuit includes in addition to the Group "A" and "B" switches a position selector station 120 having a plurality of push buttons S1, S2, S3, S4, S5, and S6, corresponding to the desired number of saw set positions, and connected to their associated relays R1, R2, R3, R4, R5, and R6. Each of the relays is constructed identically to relay R4, schematically illustrated as having contact pins P1—P11 with contact bar 122 normally connecting pins P1 and P4, bar 124 normally connecting pins P5 and P6, bar 126 normally connecting pins P8 and P11, and relay coil 128 connected between pins P2 and P10. When the coil 128 is energized, bar 122 moves from pin P4 to pin P3, bar 124 from pin P5 to pin P7, and bar 126 from pin P8 to pin P9.

The system is operated from supply conductors 130, 132 connected to a 110 volt AC power supply. A step down transformer 134 supplies 24 volts AC to full wave DC rectifier 136 to provide 24 volts DC to the holding relay switches B1—B6 for energizing relays R1—R6 in a manner to be described.

Conductor 138 leads from supply line 130 (FIG. 5) to the forward and reverse windings 160, 162 respectively (FIG. 3) of reversible motor 42 and conductor 140 connects to pin P7 of each of the relays to deliver 110 volts AC to the motor windings through switches A1—A6 when a change in set saw position is desired. Conductors M1—M6 connect the switches A1—A6 of FIG. 3 to relays R1—R6 of FIG. 5 and conductors L1—L6 and LP1—LP6 connect the switches B1—B6 of FIG. 4 to the relays R1—R6 and selector buttons S1—S6 of FIG. 5.

Assume for illustrative purposes that button S1 represents a first saw position of minimum spacing between saws 14 and 16 to provide a relatively narrow or short piece of wood and that button S6 represents a sixth saw position of maximum spacing to provide a relatively wide or long piece of wood. Buttons S2—S5 then represent intermediate positions and lengths of cut. Assume also that the saws are initially at rest in the first position.

The initial or rest position of cam 70 as viewed in FIG. 3 will be with cam surface 71 in a bottom position wherein it contacts followers 108 of overtravel switches 104 and 106 but does not engage any of the followers of switches A1—A6. In this position, cam bar 74 will be out of contact with contact followers 110 of switches B1—B6.

Operation of the system is as follows with reference to FIGS. 3—5. Initially, with all the push buttons in the rest position illustrated button S1, the relays R1—R6 are deenergized and motor 42 is stopped, since the current passing through conductor 142 from rectifier 136 merely passes from the common terminal "z" through the normally closed contact "x" of button S6 to the common terminal "z" of button S5 and so on, with no current going to any of the relays.

In a first mode of operation assume an operator desires to move the saws from the first rest position to the fourth position indicated by button S4, the button S4 is depressed as shown in FIG. 5 to close its normally open contacts "y". Current then flows from conductor 142 through buttons S6, S5, S4 through line L4 to pin P9 of relay R4. Conductor L4 also leads to the normally closed contact "x" of switch B4, which initially is connected to the common terminal "z", to pass current through switch B4 and back to pin P10 of relay R4 by conductor LP4. The relay R4 is then energized since the current continues to pass from pin P10 through coil 128 to pin P2 which is connected by line 144 to rectifier 136. Energization of relay R4 moves contact bar 122 to connect pins P1 and P3, bar 124 to connect pins P6 and P7, and bar 126 to connect pins P9 and P11, the latter of which establishes a relay holding circuit independent of button S4 through line 142, line 146, pin P11, bar 126, pin P9, line L4, switch B4, line LP4, pin P10, coil 128, pin P2, line 144, and rectifier 136. When the relay holding circuit has been established, button S4 is released to return to its normal position.

Movement of bar 124 to connect pins P6 and P7 passes current through line 140, line M4, the common terminal "z" of switch A4, through the normally closed contact "x" of switch A4 to conductor 150 and the normally open contact "y" of overtravel switch 104 which has been closed by cam surface 71 engaging follower 108. The current then passes through switch 104 out through its common terminal "z" to conductor 152, forward motor winding 160, and conductor 138. Motor 42 will then be energized to rotate screw 32 in a forward direction so that saws 14 and 16 are moved away from each other along oppositely threaded screw portions 34 and 36, respectively, toward set position four. Also with energization of motor 42, cam 70 and arm 74 will be driven counterclockwise by gear drive 75 to the positions shown in FIGS. 3 and 4, at which time cam surface 71 engages follower 108 of switch A4 to open its normally closed contacts "x" to stop the flow of current to winding 160 and thus stop motor 42 and saws 14 and 16 in the fourth set position. At the same time cam bar 74 engages follower 110 of switch B4 to open its normally closed contacts "x" and break the holding circuit around relay R4 to deenergize it.

In a second mode of operation, if an operator should subsequently desire to move the saws from set position four to position six, the same sequence of steps would be followed as above, except that button S6, relay R6, and switches A6 and B6 would be controlling.

In a third mode of operation, assume now that it is desired to move the saws from position four back to position two. The cam 70, cam bar 74, and the switches of Groups A and B would initially be positioned as shown in FIGS. 3 and 4. Upon depression of button S2 current flows from line 142 through buttons S6, S5, S4, S3, S2 through line L2 to pin P9 of relay R2. Current also passes to switch B2 and back to pins P9 and P11 of relay R2 to establish the holding current for the relay and direct current to the common terminal of switch A2 by line M2 in the same manner as described above. However, because cam surface 71 is engaging follower 108 of switch A2 and closes the normally open contacts "y" thereof, current will pass through line M2, switch A2, conductor 164, the common terminal "z" of overtravel switch 106 through its normally closed contacts "x" to conductor 166 and reverse motor winding 162. Motor 42 will be energized to rotate screw 32 in a reverse direction to move saws 14 and 16 toward each other to set position two and also to rotate cam 70 in a clockwise direction until cam surface 71 disengages follower 108 of switch A2 to deenergize motor 42 and cam bar 74 engages follower 110 of switch B2 to deenergize relay R2.

The provision of overtravel switches 104 and 106 provides a built-in safety device for the set works should the switches A1—A6 malfunction and fail to deenergize the motor. The overtravel switches serve to limit the distance of travel of saws 14 and 16, i.e. the saws may never come so close as to contact each other or become so far spaced as to have guides 46 and 48 contact bearings 40 and 38, respectively. In this manner, the limit switches prevent damage to the mechanical parts of the system and also prevent physical injury to an operator.

Assume that for the above-described first mode of operation, the follower 108 of switch A4 does not open the normally closed contacts "x" of the switch as it should when it engages cam surface 71. Motor 42 would continue to run and move saws 14 and 16 away from each other past the desired set position four. If the limit switches were not present, motor 42 would be uncontrolled and saw guides 46 and 48 would be moved on screw portions 34 and 36 until they jammed against bearings 40 and 38, respectively. However, cam 70 also is being rotated counterclockwise by motor 42 and when it reaches an angular position wherein follower 108 of limit switch 104 disengages cam surface 71, the switch returns to its normal state to open its normally open contacts "y" and stop the flow of current to motor winding 160, and thus deenergize the motor and stop the travel of saws 14 and 16 before the guides 46 and 48 jam against the bearings.

Similarly, if during the above-described third mode of operation the saws are being driven toward each other and a switch A1—A6 malfunctions, cam 70 will continue to be driven clockwise until cam surface 71 engages follower 108 of limit switch 106, thus interrupting the flow of current to reverse winding 162 and stopping motor 42 and saws 14 and 16 before the saws abut each other.

The present invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and the changes which come within the meaning and range of equivalency of the claims are therefore intended to be embraced therein.

I claim:

1. In a saw mill edger, a frame, a plurality of saws mounted on said frame for rotation in side-by-side spaced relation, edger set work means including reversible motor means for moving at least one of said saws toward and away from the others to various predetermined positions establishing cuts of varying spaced relation, control means connected to said motor means for selecting a desired predetermined position, said control means comprising an electric source, a first group of switches connected to said motor means, each of said switches in said first group corresponding to a desired predetermined saw set position, said first and second groups of switches being mounted adjacent each other, actuator cam means driven by said motor means and supported adjacent said first and second group of switches and activating said switches to control the operational state of said motor means and relays, and selector means for electrically connecting said relays to said source for selecting initially a predetermined set position for said saw.

2. The saw mill edger of claim 1, wherein said edger set work means comprises a mounting ring, means for adjustably mounting said first group of switches around the periphery of said ring with said second group of switches being connected laterally adjacent to and supported from said first group of switches, and said actuator cam means having a cam surface for actuating said first group of switches and a laterally extending cam bar adjacent one end of said cam surface for actuating said second group.

3. In a saw mill edger, a frame, a plurality of saws mounted on said frame for rotation in side-by-side spaced relation, edger set work means including reversible motor means for moving at least one of said saws toward and away from the others to various predetermined positions establishing cuts of varying spaced relation, control means connected to said motor means for selecting a desired predetermined saw set position, a first group of switches connected to said motor means, a plurality of relays controlling the flow of electric current through said switches to said motor means, a second group of switches electrically connecting said relays to said source, a mounting ring, means for adjustably mounting said first group of switches around the periphery of said ring with said second group of switches being connected laterally adjacent to and supported from said first group of switches, actuator cam means driven by said motor means and supported adjacent said first and second groups of switches, said actuator cam means having a cam surface for actuating said first group of switches and a laterally extending cam bar for actuating said second group of switches to control the operational state of said motor means and relays, selector means for electrically connecting said relays to said source for selecting initially a predetermined set position for said saw, and overtravel limit switches located at each end of said first group of switches and actuated by said cam surface, said limit switches electrically connected between said motor means and said first group of switches to control said motor means and limit the lateral movement of said saw to within a predetermined distance range.

4. In a saw mill edger, a frame, a plurality of saws mounted on said frame for rotation in side-by-side spaced relation, edger set work means including reversible motor means for moving at least one of said saws toward and away from the others to various predetermined positions establishing cuts of varying spaced relation, control means connected to said motor means for selecting a desired predetermined position, said control means comprising an electric source, a first group of switches connected to said motor means, a plurality of relays controlling the flow of electric current through said switches to said motor means, a second group of switches electrically connecting said relays to said source, said first and second groups of switches mounted adjacent each other, actuator cam means driven by said motor and supported adjacent said first and second groups of switches and activating said switches to control the operational state of said motor means and relays, selector means for electrically connecting said relays to said source for selecting initially a predetermined set position for said saw, said relays including contact means to establish a holding circuit therefor independent of said selector means, whereby, after initial energization through said selector means, said relays remain energized until they are deenergized by activation of said second group of switches by said cam means.

5. In a saw mill edger, a frame, a plurality of saws mounted on said frame for rotation in side-by-side spaced relation, edger set work means including reversible motor means for moving at least one of said saws toward and away from the others to various predetermined positions establishing cuts of varying spaced relation, control means connected to said motor means for selecting a desired predetermined position, said control means comprising an electric source, a first group of switches connected to said motor means, a plurality of relays controlling the flow of electric current through said switches to said motor, a second group of switches electrically connecting said relays to said source, said first and second groups of switches mounted adjacent each other, actuator cam means driven by said motor and supported adjacent said first and second groups of switches and activating switches to control the operational state of said motor and relays, selector means for electrically connecting said relays to said source for selecting initially a predetermined set position for said saws, and overtravel limit switches actuated by said cam means to control said motor means and limit the lateral movement of said saw to within a predetermined distance range.

6. In the saw mill edger of claim 1, wherein the number of switches in said second group corresponds to the desired number of predetermined saw set positions.

7. A control system for adjusting the set position of edger set saws comprising an electric source, a reversible motor, a mounting ring, a first group of switches adjustably mounted around the periphery of said ring and electrically connected to said motor, a second group of switches mounted laterally adjacent and supported from said first group, a plurality of relays controlling the flow of current from said second group of switches to said first group of switches, cam means driven by said motor for actuating said groups of switches, position selector means for initially connecting said second group of switches to said source, and said relays having contact means providing a holding circuit therefor through which said second group of switches is connected to said source, whereby after initial energization through said selector means a relay remains energized independently of said selector means until said cam means actuates said second group of switches.

8. A switching arrangemnt adapted to adjust the set position of edger set saws comprising a mounting ring, a first group of switches adjustably mounted around the periphery of said ring and adapted to control a reversible motor, a second group of switches mounted laterally adjacent and supported by said first group and operatively connected thereto, and cam means adapted to be driven by said motor and located adjacent said switches for actuating said switches, said cam means comprising a cam surface for actuating said first group of switches and a laterally extending cam bar adjacent one end of said cam surface for actuating said second group of switches.